UNITED STATES PATENT OFFICE.

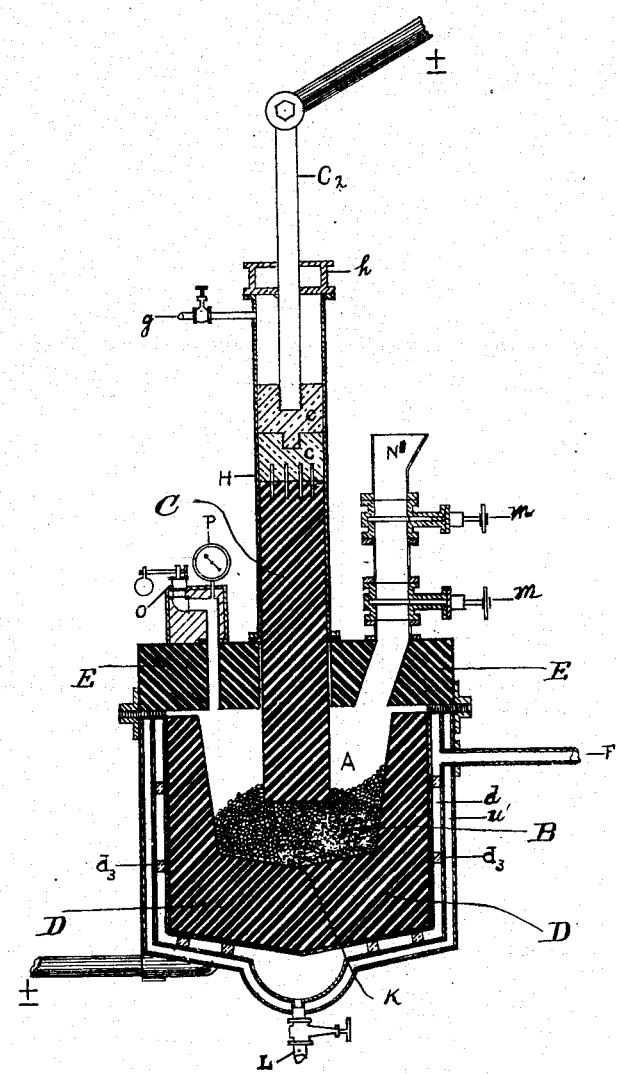

ALFRED H. COWLES, OF CLEVELAND, OHIO, ASSIGNOR TO THE ELECTRIC SMELTING AND ALUMINUM COMPANY, OF ILLINOIS.

PROCESS OF REDUCING SODIUM COMPOUNDS.

SPECIFICATION forming part of Letters Patent No. 673,761, dated May 7, 1901.

Application filed July 20, 1895. Serial No. 557,172. (No specimens.)

*To all whom it may concern:*

Be it known that I, ALFRED H. COWLES, a citizen of the United States, residing at Cleveland, in the county of Cuyahoga and State of Ohio, have invented certain new and useful Improvements in Processes of Reducing Sodium Compounds; and I do hereby declare the following to be a full, clear, and exact description of the invention, such as will enable others skilled in the art to which it appertains to make and use the same.

The object of the present process is to simultaneously reduce sodium compounds of refractory oxids non-reducible practically by ordinary fiery processes with carbon, the purpose being to obtain separately the sodium and the base of the oxid, either as metal, carbid, or alloy.

In the application of the process herein described I make use of an electric furnace, not necessarily limited as to type, but which must, of course, be provided with a suitable condenser.

In the drawings hereto annexed I have shown a furnace covered by my applications filed November 24, 1899, Serial No. 738,201, and August 30, 1900, Serial No. 28,606, both of which are divisionals of this application, well adapted to the carrying out of the process hereinafter described and which form I prefer to use, it being understood that a different form of furnace may be successfully used if it be so constructed that the interior temperature throughout can be heated to a temperature above the vaporizing-point of sodium and maintained at such temperature during the operation.

My application filed September 27, 1900, Serial No. 31,284, is a further division of this application.

In the drawing which shows in central vertical section an electric furnace arranged for carrying out my present invention, A represents the furnace-chamber, the walls of which are formed of compacted, but porous, carbon or of hard compacted carbon, in which are arranged blocks or masses of porous carbon or charcoal permeable to the gases and vapors evolved in the operation.

B represents the ore charge, hereinafter described.

C is the carbon electrode, attached to a rod $C^2$ by means of an intermediate metallic plug or plugs $c$ and having suitable connection with the electric circuit generated by dynamo or other suitable generator of electricity, which may produce either continuous or alternated current.

D represents the carbon lining and carbon hearth of the furnace. Inclosing the carbon wall or lining is a metallic double-walled jacket $d$, the inner wall of which, in contact with the carbon lining of the furnace, is perforated with numerous openings, through which the gases and vapor from the furnace may enter the space between the wall of the jacket $d$, which forms a condenser in which the metallic vapors will be condensed, as hereinafter described. Outside of the jacket $d$ is a water-jacket $u'$, surrounding the same and provided with suitable water inlet and outlet pipes, the office of said jacket being to maintain the temperature of the condensing-jacket $d$ at the proper temperature to effect the condensation of the sodium vapors discharged thereinto. An exhaust-pipe F opens from the upper part of the jacket $d$, through which the carbonic oxid generated in the operation is passed off, assisted, if need be, by a suction-blower or equivalent device, (not shown,) which may be attached to the pipe F. At the bottom of the furnace-chamber a tap-hole K is provided, and at the bottom of the jacket $d$ a discharge-pipe L for drawing off the condensed sodium is provided. One of the electric terminals is attached to the outer metal casing, as at M, the other leading to the rod $C^2$, as shown at N.

The top of the furnace-chamber is preferably made separable from the main body of the furnace and is internally lined with compacted carbon E and outwardly incased with an iron shell, a suitable layer of insulating material being placed between the cover and body of the furnace, as shown in the drawing. The electrode C, passing through the cover of the furnace, plays in a pipe H, connected to, but insulated from, the metallic casing of the cover. At the top of the pipe H is a stuffing-box $h$, through which the rod $C^2$ passes, practically gas-tight. Although not strictly essential, I prefer to connect to the upper parts of the pipe H an inlet-pipe $g$, through which, if found necessary or desirable, a small quantity of hydrocarbon gas or gas-forming liquid may be passed, the purpose of this being to prevent any small amount of sodium from passing up as vapor around the electrode and into the upper part of the pipe H and condensing there. A sufficient amount of the hydrocarbon gas can be admitted to maintain a slight escape thereof down around the electrode. For feeding in the ore charge through the furnace a hopper M', provided with valves $m\ m$, is located at the top of the furnace, and a safety-valve O is also by preference provided, opening from the top of the furnace, and a pressure-gage P at a convenient point.

One of the cables for the electric current is attached to the outer wall of the jacket, (it may be at any point,) and the course of the current is from the circuit-cable connected with the electrode C, through the charge, the walls of the furnace-chamber, the stay-blocks, and the incasing water-jacket to the other circuit-terminal.

Although the electric furnace hereinabove described is especially applicable to the reduction of the class of compounds above mentioned, of which aluminate of soda ($Na_2Al_{12}O_4$) is a type, it is applicable to other classes of reactions and to processes where salts are being electrolized, and I wish it to be fully understood that its application is not limited to the class of operations herein described.

Taking aluminate of soda as a typical compound to which my process is applicable, I proceed as follows in carrying out the reduction and process with that substance: I take a mixture of aluminate of soda, with coke or carbon in any form, forming such mixture either by mixing the crushed, ground, or granulated materials or by forming a mass of sodic aluminate saturated with a hydrocarbon and baked and, if need be, crushed, or by mixing the aluminate of soda with carbon and coal-tar or pitch or equivalent carbonaceous matter, it being desirable that the ore charge should not be two powdery in consistence, and it being also preferable, except when carbids are being formed, that no excess of carbon above the amount necessary for the reduction should be employed, since such excess will accumulate in the furnace and may need to be removed. The charge mixture is fed through the hopper into the furnace in successive portions, regulated, according to the judgment of the operator, by the temperature and pressure in the furnace. If the ore charge is fed too slowly, the furnace will become too hot, which will be indicated to the operator not only by the noticeable increase of temperature of the furnace and the water discharging from the water-jacket, but also by the diminished amount of carbonic oxid passing off. If the charge is fed too fast, there will accumulate in the furnace a mass of fused unreduced alumina, which will be observed in tapping off from time to time the contents of the furnace. As the ore charge is fed into the furnace the high temperature causes the sodium to distil off rapidly along with the carbonic oxid produced by the reduction of the oxid of aluminium, these gaseous products passing passing through the porous carbon walls of the furnace into the condenser formed by the jacket $d$, being perfectly strained from dust in their passage through the carbon walls, the vapor of sodium condensing on the outer cooler walls of the jacket $d$ and trickling down the same as a liquid into bottom of the condenser, from which it is drawn off at proper intervals, while the carbonic oxid, being uncondensed, passes off through the outlet-pipe F. The space within the jacket $d$ is kept at a temperature above 96° centigrade, at which temperature sodium is liquid; but by means of the water-jacket it is kept below the temperature (red heat) at which sodium is volatile. To better effect the prevention of the inner wall of the jacket $d$ from reaching too high a temperature, it is advisable that the two walls of the jacket $d$ should be connected at several points by metallic blocks or stays $d^3$, by which the temperature of the two walls of the jacket will be more readily and perfectly adjusted and danger of the melting of the inner wall be prevented. The interior of the furnace is maintained at a very high temperature, reaching incandescence on the inner surface of the carbon wall and decreasing to a dull red heat at the iron casing. By this means sodium is prevented from condensing in the furnace and any possibility of short-circuiting arising from condensed sodium condensing on the inner walls of the furnace at the junction of the cover and body-wall or elsewhere is prevented, although such short-circuiting could not occur to an extent to materially effect the operation, since the sodium in such case would be instantly volatilized by the heat of the current shunted through it. The gases evolved in the furnace during the operation create a pressure within the furnace, which will be indicated to the operator by the pressure-gage P, and although there is very little, if any, danger of the pressure reaching a point where any injury to the apparatus could occur therefrom, yet the possibility thereof is fully obviated by providing the safety-valve O. This pressure in the furnace materially assists in driving through the porous carbon wall of the furnace the volatilized sodium vapor and the gases evolved in the operation. The oxid of aluminium left by driving off the sodium from the aluminate is acted upon and reduced by the carbon, the reaction yielding carbonic oxid and carbid of aluminium, the carbonic oxid passing through the walls of the furnace and the aluminium carbid remaining and accumulating in the bottom of the furnace, from which it is at suitable intervals tapped off through the opening K. By adding through the ore charge or otherwise in reducing it in the furnace a metal less volatile than sodium—as, for instance, iron, copper, or tin—an alloy of the reduced aluminium with such metal is obtained. Further, by adding in the same manner a volatile metal, such as zinc, there will be obtained in the condenser an alloy of sodium with such other volatile metal. All of such operations and reactions are within the scope of the process which forms the subject-matter of the present invention. It is also advisable in operating the furnace to heat up the furnace to a high temperature before adding the ore to be reduced, which is readily done by putting in a quantity of granular carbon in the bottom of the furnace to save the carbon lining of the furnace and allowing the arc to play thereon, one advantage of which is that by previously raising the furnace to a temperature so high that the ore will reduce rapidly a more perfect operation is secured and the process is rendered more economical. The charge fed into the furnace should be proportionate to the electrical energy delivered to the furnace, the best results being obtained when the electric current and the feed of ore are so proportioned that the ore is reduced as fast as fed in and the process conducted in a substantially continuous manner.

By mixing sodium compounds with calcium compounds and the proper proportion of carbon there may be obtained by this process sodium volatilized and condensed in the condenser and calcium carbid remaining in the furnace.

What I claim as my invention, and desire to secure by Letters Patent, is—

1. The herein-described electric smelting process for manufacturing metallic sodium and reducing the alumina constituent of sodium aluminate, which consists in forming a mixture of sodic aluminate with granular broken or finely-divided carbon, heating said mixture in a tight chamber by heat generated from an electric current, whereby the volatile elementary substance sodium is reduced and passes out of the chamber, condensing the sodium vapor, and tapping or removing from the furnace the reduced product, substantially as set forth.

2. The herein-described electric smelting process for manufacturing metallic sodium and an aluminous product from aluminate of soda, which consists in forming a mixture of sodic aluminate with carbon in a granular, broken or intimately-associated condition in proper proportions, heating said mixture in a tightly-closed chamber by heat generated from an electric current, whereby the sodium is reduced, volatilized and passed out of the chamber, the aluminium is reduced from its oxid and combined with carbon, collecting and condensing the sodium vapor, and tapping or removing from the furnace the carbid, substantially as described.

In testimony whereof I hereto affix my signature in presence of two witnesses.

ALFRED H. COWLES.

Witnesses:
WM. C. GILRIE,
W. P. DAVISON.